United States Patent
Wang

(10) Patent No.: US 10,284,134 B2
(45) Date of Patent: May 7, 2019

(54) METHOD FOR CONTROLLING A FAN MODULE OF A SERVER RACK AND CONTROLLER UNIT FOR IMPLEMENTING THE SAME

(71) Applicant: MITAC COMPUTING TECHNOLOGY CORPORATION, Taoyuan (TW)

(72) Inventor: Po-Wei Wang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 15/677,402

(22) Filed: Aug. 15, 2017

(65) Prior Publication Data
US 2018/0115273 A1   Apr. 26, 2018

(30) Foreign Application Priority Data
Oct. 20, 2016   (TW) .............................. 105133808 A

(51) Int. Cl.
*G06F 11/20*     (2006.01)
*H02P 29/68*     (2016.01)

(52) U.S. Cl.
CPC .................................. *H02P 29/68* (2016.02)

(58) Field of Classification Search
CPC ... G06F 11/2033; G06F 11/2025; H02P 29/68
USPC ........................................................... 714/3
See application file for complete search history.

(56) References Cited

U.S. PATENT DOCUMENTS

2016/0070627 A1*   3/2016   Huang ................ G06F 11/2025
                                                714/4.12

FOREIGN PATENT DOCUMENTS

| CN | 2295862 Y | 10/1998 |
| CN | 102052338 A | 5/2011 |
| CN | 105404366 A | 3/2016 |

\* cited by examiner

*Primary Examiner* — Eduardo Colon Santana
*Assistant Examiner* — Cortez M Cook
(74) *Attorney, Agent, or Firm* — Michael Best & Friedrich LLP

(57) ABSTRACT

A method for controlling a fan module mounted in a region of a server rack. The method is implemented by a controller unit including a RMC and a region controller that corresponds to the region, and includes: receiving by the region controller temperature data from the server; determining by the region controller whether the RMC operates in a normal state; when the determination is affirmative, transmitting by the region controller the temperature data to the RMC, and controlling by the RMC a fan speed of the fan module according to the temperature data; and when the determination is negative, controlling by the region controller the fan speed according to the temperature data received from the server.

10 Claims, 2 Drawing Sheets

METHOD FOR CONTROLLING A FAN MODULE OF A SERVER RACK AND CONTROLLER UNIT FOR IMPLEMENTING THE SAME

CROSS-REFERENCE TO RELATED APPLICATION

This application claims priority to Taiwanese Patent Application No. 105133808 filed on Oct. 20, 2016.

FIELD

The disclosure relates to a method for controlling a fan module of a server rack, and a controller unit for implementing the method.

BACKGROUND

Generally, a server rack is provided with a plurality of fan modules for dissipating heat generated by servers mounted in the server rack.

Rotation speed of the fan modules are usually controlled by a Rack Management Controller (RMC) according to current temperature of the servers in the server rack and the demand for dissipating heat. When a malfunction of the RMC occurs or the RMC is removed for maintenance, additional circuits such as a Pulse Width Modulation (PWM) circuit may take over the role of the RMC and control the fan modules to rotate at a full speed. However, as a result of full speed rotation of the fan modules, power consumption and noise generated by the fan modules are considerably increased, and lifecycle of the fan modules may be decreased. An alternative solution is to provide an additional processor hot (prochot) circuit which may be employed as an additional circuit for controlling rotation speed of the fan modules to be at a constant speed and for reducing computing performance of the servers, e.g., adjusting operating frequencies of processors in the servers, so as to ensure that the servers operate at a safe operating temperature.

SUMMARY

Therefore, an object of the present disclosure is to provide a method for controlling a fan module of a server rack. The fan module is mounted in a region of the server rack for dissipating heat generated by at least one server mounted in the region. A controller unit for implementing the method includes a rack management controller, and at least one region controller that corresponds to the region and that is electrically connected to the rack management controller, the fan module and the at least one server.

According to one aspect of the present disclosure, the method includes steps of: a) receiving, by the region controller, temperature data from the at least one server; b) determining, by the region controller, whether the rack management controller operates in a normal state; c) when the determination made in step b) is affirmative, transmitting, by the region controller, the temperature data to the rack management controller, and controlling, by the rack management controller, a fan speed of the fan module according to the temperature data received from the region controller; and d) when the determination made in step b) is negative, controlling, by the region controller, the fan speed of the fan module according to the temperature data received from the at least one server.

According to another aspect of the present disclosure, a controller unit for controlling a fan module of a server rack is disclosed. The fan module is mounted in a region of the server rack for dissipating heat generated by at least one server that is mounted in the region. The controller unit includes a rack management controller (RMC) and a region controller. The region controller is electrically connected to the RMC, is configured to be electrically connected to the fan module and the at least one server, and is programmed to receive temperature data from the at least one server, determine whether the RMC operates in a normal state, transmit the temperature data to the RMC when it is determined that the RMC operates in the normal state, and control a fan speed of the fan module according to the temperature data received from the at least one server when it is determined that the RMC does not operate in the normal state. The RMC is configured to control the fan speed of the fan module according to the temperature data received from the region controller.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
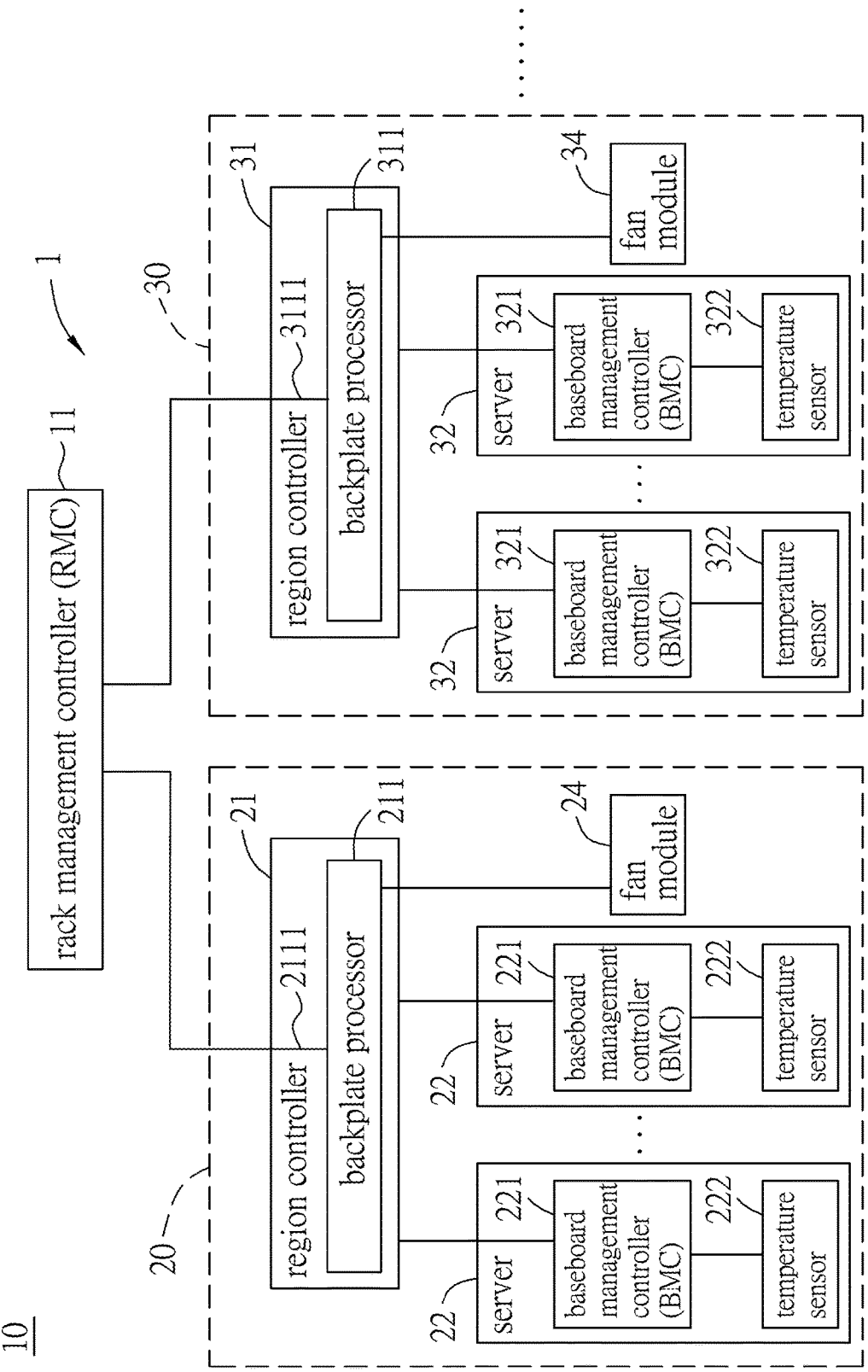
FIG. 1 is a block diagram illustrating a controller unit for controlling a plurality of fan modules of a server rack according to an embodiment of the present disclosure.

Referring to FIG. 1, a server rack 10 includes a plurality of fan modules (e.g., fan modules 24, 34), and a controller unit 1 for controlling the fan modules according to an embodiment of this disclosure. The server rack 10 has a plurality of regions (e.g., regions 20, 30) with a plurality of servers mounted in the regions. For example, as shown in FIG. 1, a plurality of severs 22 are mounted in the region 20, and a plurality of servers 32 are mounted in the region 30. It should be noted that the number of the servers in each of the plurality of regions may be varied as required. For example, the fan modules 24, 34 are mounted respectively in the regions 20, 30 for dissipating heat generated by the servers 22 and the servers 32, respectively.

Each server 22, 32 includes a baseboard management controller (BMC) 221, 321 for monitoring operating state of the server 22, 32, and a temperature sensor 222, 322 for detecting temperature of a corresponding one of the regions 20, 30 where the server 22, 32 is mounted and for generating temperature data in accordance with the temperature detected thereby. In particular, the BMC 221, 321 monitors the state of power supply to the server 22, 32 and an operating system of the server 22, 32, and is electrically connected to the temperature sensor 222, 322 for receiving the temperature data.

In this embodiment, the controller unit 1 includes a rack management controller (RMC) 11, and a plurality of region controllers (e.g., two region controllers 21, 31) corresponding to the plurality of regions, respectively. The RMC 11 monitors the operating states of the servers 22, 32, a fan controller panel and power supply units of the servers and the fan modules of the server rack 10. Each of the region controllers 21, 31 corresponds to a respective one of the regions 20, 30. For example, each of the region controllers 21, 31 is a backplate disposed in the corresponding one of the regions 20, 30, and includes a backplate processor 211, 311 connected to the RMC 11. In each region 20, 30, the backplate processor 211, 311 of the corresponding region controller 21, 31 is connected to the corresponding fan module 24, 34, and the BMCs 221, 321 of the corresponding servers 22, 32. Note that each backplate processor 211, 311 may be directly connected to the corresponding fan module 24, 34, or may be connected to the corresponding fan module 24, 34 via a fan speed controller (not shown).

Figure 2:
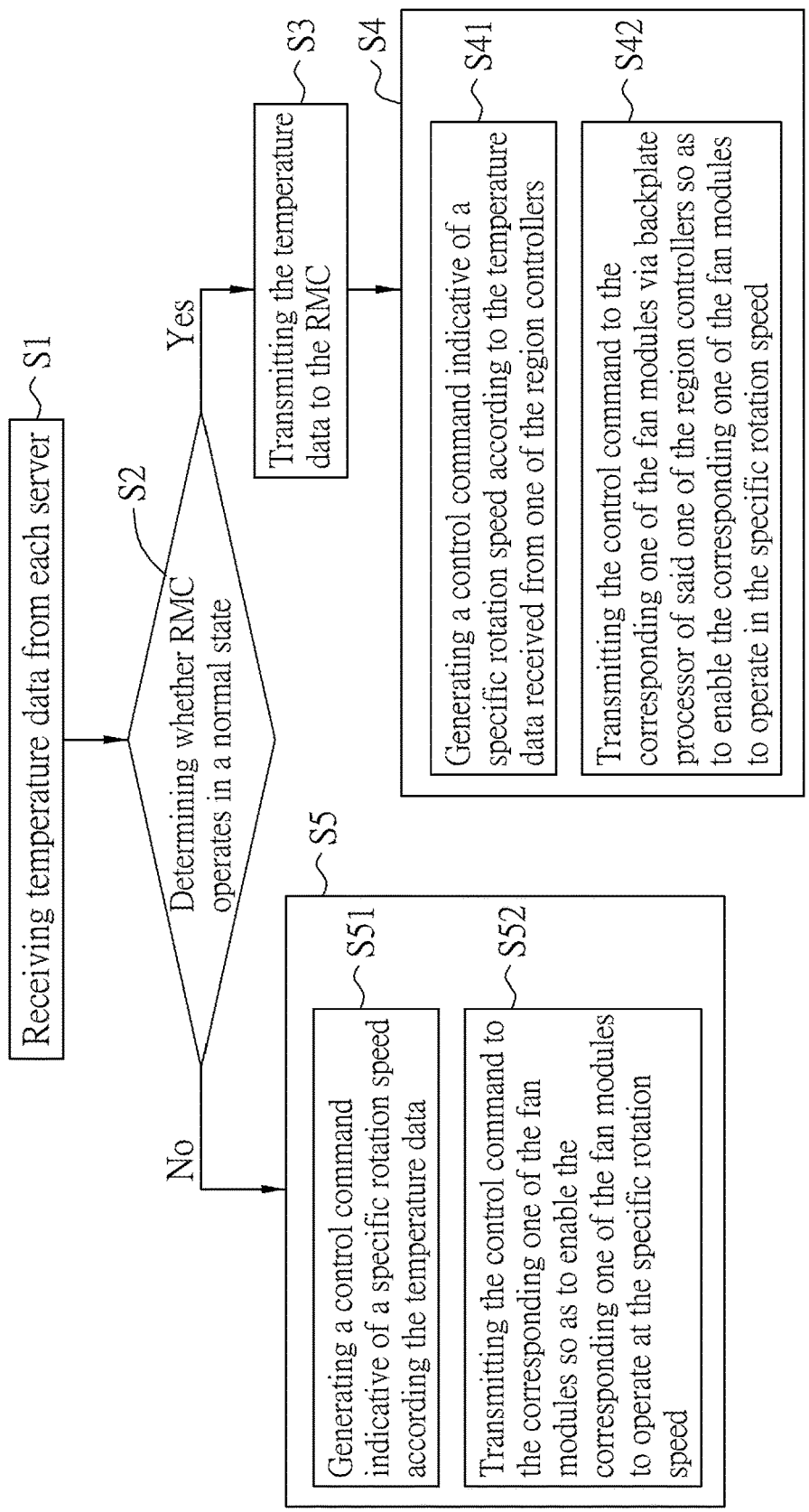
FIG. 2 illustrates a flow chart of a method for controlling the fan modules according to an embodiment of the present disclosure.

Referring to FIG. 2, the method for controlling the plurality of fan modules to be implemented by the controller unit 1 according to an embodiment of the present disclosure is illustrated.

In step S1, the backplate processor 211, 311 of each region controller 21, 31 receives the temperature data from the servers 22, 32 that are disposed in the same region 20, 30 where the region controller 21, 31 is disposed. Taking the backplate processor 211 shown in FIG. 1 as an example, the temperature sensors 222 of the servers 22 output the temperature data to the BMCs 221, respectively, and then the backplate processor 211 receives the temperature data from the BMCs 221. In one embodiment, the backplate processor 211 receives the temperature data periodically (e.g., once per second) from the servers 22.

In step S2, the backplate processor 211, 311 of each region controller 21, 31 determines whether the RMC 11 operates in a normal state. In this embodiment, each backplate processor 211, 311 includes a present pin 2111, 3111, e.g., a general purpose input/output (GPIO) pin, electrically connected to the RMC 11, and determines operating status of the RMC 11 according to a detection signal carried by the present pin 2111, 3111. For example, when the logic level of the detection signal is logic "1", the backplate processor 211, 311 determines that the RMC 11 operates in an abnormal state, in which case the RMC 11 may be broken, not electrically connected to or inserted in the server rack 1 properly, or has been removed from the server rack 1. When the logic level of the detection signal is logic "0", it is determined that the RMC 11 operates in the normal state. Note that the means for determining whether the RMC 11 operates in the normal state is not limited to the illustration described above, and may be implemented in various ways in other embodiments of this disclosure. For example, in another embodiment, each backplate processor 211, 311 may transmit a query message to the RMC 11, and determines whether a response message responsive to the query message is received from the RMC 11 within a predetermined duration. That is to say, upon receipt of the response message from the RMC 11 within the predetermined duration, the backplate processor 211, 311 determines that the RMC 11 operates in the normal state; otherwise, the backplate processor 211, 311 determines that the RMC 11 operates in the abnormal state.

When the determination made in step S2 is affirmative, a flow of the method goes to step S3; otherwise, the flow goes to step S5. In step S3, the backplate processor 211, 311 of each of the region controllers 21, 31 transmits the temperature data to the RMC 11.

After step S3, the flow goes to step S4, where the RMC 11 controls a fan speed of each of the fan modules 24, 34 according to the temperature data received from the corresponding one of the region controllers 21, 31. For example, the RMC 11 controls the fan speed of the fan module 24 through the backplate processor 211 of the region controller 21 according to the temperature data received from the region controller 21.

In one embodiment, step S4 include sub-steps S41 and S42. In sub-step S41, the RMC 11 generates a control command indicative of a specific rotation speed according to the temperature data received from one of the region controllers 21, 31. After sub-step S41, sub-step S42 is performed, in which the RMC 11 transmits the control command to the corresponding one of the fan modules 24, 34 via the backplate processor 211, 311 of said one of the region controllers 21, 31 so as to enable the corresponding one of the fan modules 24, 34 to operate at the specific rotation speed. Note that, in one embodiment, the RMC 11 performs a thermal algorithm with reference to the temperature data in order to generate the control command.

In other embodiments, the RMC 11 may control, according to the temperature data received from the backplate processors of two of the plurality of region controllers that correspond to adjacent two of the plurality of regions that are adjacent in position, the fan speed of at least one of those of the fan modules that are mounted in one of the adjacent two regions. For example, when the RMC 11 determines that the temperature of the severs 22 that are mounted in the region 20 is greater than a threshold value, the RMC 11 first determines that, for example, the region 30 is adjacent to the region 20, controls the fan speed of the fan module 24 mounted in the region 20 according to the temperature data received from the backplate processor 211, and further controls the fan speed of the fan module 34 mounted in the region 30 according to the temperature data received from both of the backplate processors 211, 311. By this way, the fan module 34 may be controlled to dissipate heat generated by the servers 32 that are mounted in the region 30 as well as to facilitate heat dissipation of the servers 22 mounted in the region 20 adjacent to the region 30.

When it is determined that the RMC 11 does not operate in the normal state, in step S5, the backplate processor 211, 311 of each of the region controllers 21, 31 controls the fan speed of the corresponding one of the fan modules 24, 34 according to the temperature data received thereby. In one embodiment, step S5 include sub-steps of S51 and S52. In sub-step S51, the backplate processor 211, 311 generates a control command indicative of a specific rotation speed according to the temperature data. Upon sub-step S51, in sub-step S52, each of the backplate processors 211, 311 transmits the control command generated thereby to the corresponding one of the fan modules 24, 34 so as to enable the corresponding one of the fan modules 24, 34 to operate in the specific rotation speed. In one embodiment, the backplate processor 211, 311 performs a thermal algorithm with reference to the temperature data to generate the control command.

Note that the fan speed of the fan modules 24, 34 may be different from each other since the specific rotation speed are obtained from the temperature data received from different servers 22, 32 that are disposed in different regions 20, 30. It should be noted that the RMC 11, the backplate processor 211 and the backplate processor 311 may be configured to perform different thermal algorithms.

To sum up, in the present disclosure, the RMC 11 controls the rotation speed of the plurality of fan modules according to the temperature data received from the plurality of region controllers mounted in the plurality of regions, respectively, when operating in the normal state. Note that the RMC 11 also controls at least one of the plurality of fan modules according to the temperature data received from another one of the plurality of region controllers mounted in the adjacent region. When the RMC 11 does not operate in the normal state, the backplate processors of the plurality of region controllers take over the RMC 11, and independently control the plurality of fan modules according to the temperature data received from the corresponding servers. Specifically, the backplate processors 211, 311 dynamically control fan speed of the fan modules 24, 34 mounted in the region 20, 30 of the server rack according to the temperature data received from the region controllers 21, 31 in real time. By this way, it is not required to use a PWM circuit or a prochot circuit that controls rotation speed of the fan module at a constant speed when the RMC does not operate in the normal state.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for controlling a plurality of fan modules of a server rack, the server rack having a plurality of regions and further including a plurality of servers mounted respectively in the regions, the fan modules mounted respectively in the regions for dissipating heat generated by the servers, the method to be implemented by a controller unit including a rack management controller (RMC), and a plurality of region controllers, each corresponding to a respective one of the regions and electrically connected to the fan module and the server that are mounted in the respective one of the regions, each of the region controllers including a backplate processor that includes a pin electrically connected to the RMC, the method comprising steps of:
    a) receiving, by each of the region controllers, temperature data from a corresponding one of the servers;
    b) determining, by the backplate processor of each of the region controllers, whether the RMC operates in a normal state according to the logic level of a detection signal on the pin;
    c) when the determination made in step b) is affirmative, transmitting, by each of the region controllers, the temperature data from the corresponding one of the servers to the RMC, and
    controlling, by the RMC, a fan speed of at least one of corresponding two of the fan modules that are mounted in adjacent two of the regions according to the temperature data received from two of the region controllers that correspond to the adjacent two of the regions; and
    d) when the determination made in step b) is negative, controlling, by each of the region controllers, the fan speed of the fan module mounted in the respective one of the regions according to the temperature data received from the corresponding one of the servers.

2. The method of claim 1, wherein, in step c), controlling the fan speed of at least one of corresponding two of the fan modules includes:
    generating a control command indicative of a specific rotation speed according to the temperature data received from said two of the region controllers; and
    transmitting the control command to at least one of the corresponding two of the fan modules through at least a corresponding one of the region controllers so as to enable the at least one of the corresponding two of the fan modules to operate in the specific rotation speed.

3. The method of claim 1, wherein, in step c), when the RMC determines that temperature of one of the servers that is mounted in a first one of the regions is greater than a threshold value, the RMC controls:
    the fan speed of a first one of the fan modules mounted in the first one of the regions according to the temperature data received from a corresponding one of the region controllers; and
    the fan speed of a second one of the fan modules mounted in a second one of the regions that is adjacent to the first one of the regions according to the temperature data received from two of the region controllers that correspond to the first and second ones of the regions.

4. The method of claim 1, wherein step d) includes:
    generating a control command indicative of a specific rotation speed according to the temperature data; and
    transmitting the control command to the fan module mounted in the respective one of the regions so as to enable the fan module to operate in the specific rotation speed.

5. A controller unit for controlling a plurality of fan modules of a server rack, the server rack having a plurality of regions and further including a plurality of servers mounted respectively in the regions, the fan modules mounted respectively in the regions for dissipating heat generated by the servers, said controller unit comprising:
    a rack management controller (RMC); and
    a plurality of region controllers, each of which corresponds to a respective one of the regions, includes a backplate processor including a pin electrically connected to said RMC, is configured to be electrically connected to the fan module and the server that are mounted in the respective one of the regions, and is programmed to
    receive temperature data from a corresponding one of the servers,
    determine whether said RMC operates in a normal state according to the logic level of a detection signal on said pin,
    transmit the temperature data to said RMC when it is determined that said RMC operates in the normal state, and
    control a fan speed of the fan module mounted in the respective one of the regions according to the temperature data received from the corresponding one of the servers when it is determined that said RMC does not operate in the normal state;
    wherein said RMC is configured to control, according to the temperature data received from two of the region controllers that correspond to adjacent two of the regions, the fan speed of at least one of corresponding two of the fan modules that are mounted in the adjacent two of the regions.

6. The controlling unit as claimed in claim 5, wherein said RMC generates a control command indicative of a specific rotation speed according to the temperature data received from said two of said region controllers and transmits the control command to at least one of the corresponding two of the fan modules through at least a corresponding one of said region controllers so as to enable the at least one of the corresponding two of the fan modules to operate in the specific rotation speed.

7. The controlling unit of claim 5, wherein, when said RMC determines that temperature of one of the servers that is mounted in a first one of the regions is greater than a threshold value, said RMC controls:

the fan speed of a first one of the fan modules mounted in the first one of the regions according to the temperature data received from a corresponding one of said region controllers; and the fan speed of a second one of the fan modules mounted in a second one of the regions that is adjacent to the first one of the regions according to the temperature data received from two of said region controllers that correspond to the first and second ones of the regions.

8. The controlling unit of claim 5, wherein each of said region controllers generates a control command indicative of a specific rotation speed according to the temperature data, and transmits the control command to the fan module mounted in the respective one of the regions so as to enable the fan module to operate in the specific rotation speed.

9. The controlling unit of claim 8, wherein said backplate processor of each of said region controllers is configured to generate a control command indicative of a specific rotation speed according to the temperature data and to transmit the control command to said fan module mounted in the respective one of the regions through said region controller so as to enable said fan module to operate in the specific rotation speed.

10. A method for controlling a plurality of fan modules of a server rack, the server rack having a plurality of regions and further including a plurality of servers mounted respectively in the regions, the fan modules mounted respectively in the regions for dissipating heat generated by the servers, the method to be implemented by a controller unit including a rack management controller (RMC), and a plurality of region controllers each corresponding to a respective one of the regions and electrically connected to the RMC, the fan module and the server that are mounted in the respective one of the regions, the method comprising steps of:

receiving, by each of the region controllers, temperature data from the a corresponding one of the servers;

transmitting, by each of the region controllers, a query message to the RMC;

determining, by each of the region controllers, whether a response message responsive to the query message is received from the RMC within a predetermined duration;

upon receipt of the response message from the RMC within the predetermined duration, determining, by each of the region controllers, that the RMC operates in a normal state, transmitting, by each of the region controllers, the temperature data from the corresponding one of the servers to the RMC, and controlling, by the RMC, a fan speed of at least one of corresponding two of the fan modules that are mounted in adjacent two of the regions according to the temperature data received from two of the region controllers that correspond to the adjacent two of the regions; and when it is determined that a response message responsive to the query message is not received from the RMC within the predetermined duration, determining, by each of the region controllers, that the RMC operates in an abnormal state, and controlling, by each of the region controllers, the fan speed of the fan module mounted in the respective one of the regions according to the temperature data received from the corresponding one of the servers.

* * * * *